Dec. 6, 1966  W. FRITSCH  3,290,082
RESILIENT ELONGATED BUFFER AND COEXTENSIVE MOUNTING MEANS
Filed Dec. 9, 1964
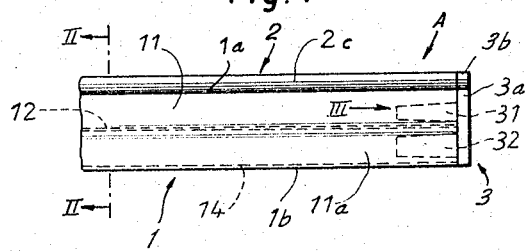
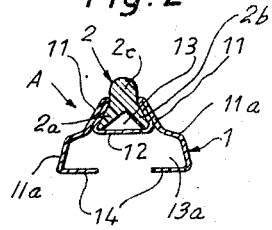
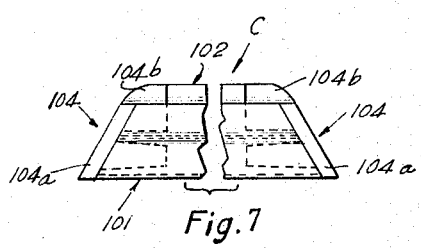
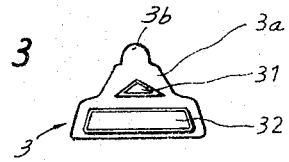
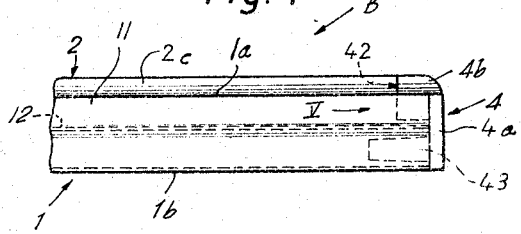
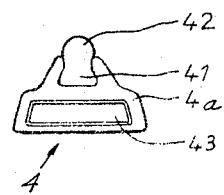
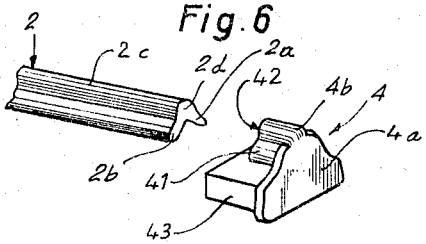
Inventor:
WALTER FRITSCH
BY Michael J. Striker
his ATTORNEY

United States Patent Office 3,290,082
Patented Dec. 6, 1966

3,290,082
RESILIENT ELONGATED BUFFER AND
COEXTENSIVE MOUNTING MEANS
Walter Fritsch, Zell am Neckar, Germany, assignor to
PEBRA G.m.b.H. Paul Braun, Esslingen, Germany
Filed Dec. 9, 1964, Ser. No. 416,999
Claims priority, application Germany, Dec. 12, 1963,
P 22,620
11 Claims. (Cl. 293—1)

The present invention relates to a strip which may be utilized as a decoration on frames of automotive vehicles or the like. More particularly, the invention relates to a decorative strip of the type wherein a rigid base or rail carries a protective insert or liner of shock-absorbent material.

It is customary to decorate the frame of an automotive vehicle with strips comprising rails of chromium-plated metallic material which is permanently or detachably secured to the frame. In many instances, such rails carry protective inserts or liners which extend beyond their front faces and consist of rubber or elastomeric plastic material capable of taking up at least some shocks to thereby protect the metallic material from dents and other damage. The liners are anchored in such a way that they cannot move in directions at right angles to the front faces of the rails but they do tend to expand or contract. The extent of such changes in length is considerable because the strips are normally long. Proposals to prevent such highly undesirable changes in length include the use of screws which are driven through the liners and extend into tapped bores in the rails, or the provision of closures or caps which are secured to the ends of the rail and include hooks, barbs or similar pointed projections which are anchored in the elastic material of the liners. All such prior proposals are rather unsatisfactory, either because the fastening devices damage the liners or because they involve additional and frequently considerable expenditures in time and material.

Accordingly, it is an important object of the present invention to provide a decorative strip for automobile frames and the like wherein the shock-absorbent liners are secured to their rails in a very simple but highly reliable manner so that they cannot undergo any shrinkage.

Another object of the invention is to provide improved closures or caps for a decorative strip of the just outlined characteristics.

A further object of the invention is to provide an improved connection between the caps and the remaining component parts of a decorative strip.

An additional object of the invention is to provide a decorative strip wherein the caps may be secured to the rail and to the shock-absorbent liner in a novel way without resorting to screws, bolts or other prefabricated fasteners.

A concomitant object of the invention is to provide a novel method of permanently securing the ends of a shock-absorbent liner to the caps of a decorative strip for the frame of an automotive vehicle.

Still another object of the instant invention is to provide a decorative strip of the above outlined characteristics which can be produced in any desired size or shape, wherein the liner may be permanently connected with the caps without affecting the appearance and/or the strength characteristics of the remaining parts, and wherein such connections may be provided by resorting to readily available tools or machines.

Briefly stated, one feature of my invention resides in the provision of a decorative strip for use on automobile frames and the like. The strip comprises an elongated hollow rail consisting of rigid material and having a front face provided with a longitudinally extending groove whose width increases in a direction inwardly of the front face, an elongated liner of elastically deformable material received in the groove and having a shock-absorbent portion extending beyond the front face of the rail, and a cap adjacent to one end of the rail and having at least one projection extending into the rail. In accordance with my invention, the cap comprises what may be termed a head which is welded, glued or otherwise integrally connected to the corresponding end of the liner and comprises a portion which constitutes a continuation of the shock-absorbent portion of the liner. Thus, by being attached to the corresponding end of the rail and being integrally connected to the liner, the cap prevents any longitudinal displacements of the liner in response to shrinkage.

The novel features which are considered as characteristic of the invention are set forth in particular in the appended claims. The improved strip itself, however, both as to its construction and the mode of assembling the same, together with additional features and advantages thereof, will be best understood upon perusal of the following detailed description of certain specific embodiments with reference to the accompanying drawings, in which:

FIG. 1 is a fragmentary side elevational view of a decorative strip for use on frames of automotive vehicles which is constructed and assembled in accordance with a first embodiment of my invention;

FIG. 2 is a transverse vertical section through the strip as seen in the direction of arrows from the line II—II of FIG. 1;

FIG. 3 is an end elevational view of a closure or cap which forms part of the strip shown in FIG. 1, the view of FIG. 3 being taken in the direction of the arrow III in FIG. 1;

FIG. 4 is a fragmentary side elevational view of a modified strip;

FIG. 5 is an end elevational view of a modified cap or closure which forms part of the strip shown in FIG. 4, the view of FIG. 5 being taken in the direction of arrow V in FIG. 4;

FIG. 6 is a perspective view of the closure or cap which is shown in FIGS. 4 and 5, further showing a portion of a shock-absorbent liner or insert which is used in the strip of FIG. 4; and FIG. 7 is a fragmentary side elevational view of a third strip.

Referring to the drawings, and first to FIGS. 1 and 2, there is shown a decorative strip A which comprises an elongated hollow rail of substantially trapezoidal cross section. The front part of the rail 1 comprises two flanges 11 which diverge in a direction from the front face 1a toward the rear face 1b of the rail, and a web 12 which connects the inner ends of the flanges 11 and is parallel to the rear face 1b. The rear part of the rail 1 comprises two side walls 11a which diverge in a direction from the web 12 toward the rear face 1b and a pair of inwardly extending coplanar rear walls 14. The components 11, 11, 12 of the front part define between themselves an elongated dovetailed groove 13 whose width increases in a direction from the front face 1a toward the rear face 1b, and the components of the rear part define between themselves and with the web 12 a second elongated groove or channel 13a.

The groove 13 accommodates the rearwardly extending legs or lips 2a, 2b of an elastically deformable insert or liner 2 which preferably consists of weldable synthetic thermoplastic material. The outer sides of the lips 2a, 2b abut against the respective flanges 11 and define with the web 12 an elongated channel of triangular cross section which forms part of the groove 13. In other words, the liner 2 fills only a portion of the dovetailed groove 13, and this liner comprises a shock-absorbent front portion 2c which extends beyond the front face 1a of the rail 1 to take up at least some shocks which, in the absence of the liner, would be transmitted to the flanges 11 and could dent or otherwise deface or damage the rail. The front portion 2c of the liner 2 is of substantially semicircular cross-sectional outline.

In accordance with an important feature of my invention, the strip A further comprises two closures or caps 3 (only one shown in each of FIGS. 1 and 3). Each cap 3 comprises a plate-like main body portion 3a and two projections 31, 32 whose cross-sectional areas diminish in a direction away from tthe main body portion 3a. Each cap 3 further comprises a front portion or head 3b which is welded, glued or otherwise integrally secured or bonded to the corresponding end of the liner 2. Thus, at least the head 3b of each cap 3 consists of a material which can be permanently and integrally connected to the material of the liner. The cross-sectional configuration of each head 3b is identical with that of the front portion 2c so that, when the strip A is fully assembled, the heads 3b constitute the end portions of the liner and may absorb at least some shocks.

In assembling the strip A, the two caps 3 are connected with the rail 1 by introducing the larger projections 32 into the corresponding ends of the channel 13a and by simultaneously introducing the smaller projections 31 into the corresponding ends of the groove 13. Owing to their diminishing cross-sectional areas, the projections 31, 32 are wedged in the rail 1 and adhere thereto with requisite strength. The projections 31 will penetrate into the remainder of the groove 13, and their sides will bear against the inner sides of the lips 2a, 2b as well as against the outer side of the web 12. Once the heads 3b are bonded to the respective end faces of the liner 2, the strip A is fully assembled and the liner is held against any appreciable shrinkage such as could reduce the eye-pleasing appearance of the strip.

If desired, each cap 3 may consist in its entirety of a thermoplastic material which is readily bonded to the liner 2, and the rail 1 may consist of metallic or rigid plastic material; for example, the rail 1 may consist of steel coated with a layer of chromium or nickel. The finished article may be clamped, welded or otherwise detachably or permanently connected to the frame of an automotive vehicle. If the strip A is connected by welding, the seams will connect the rear walls 14 to the corresponding portions of a frame. It is clear that such strips may be used with equal advantage to decorate the hulls of watercraft, the fuselages of aircraft or other types of conveyances.

In the embodiment of FIGS. 1 to 3, the plane of the main body portion 3a of the cap 3 is perpendicular to the longitudinal extension of the rail 1. The rail may be produced by an extrusion process, by stamping or by rolling, depending on the nature of its material and on the availability of machinery at the manufacturing plant.

FIGS. 4 to 6 illustrate a portion of a somewhat modified strip B having a rail 1 and a liner 2 each of which is identical with the corresponding component of the strip A. The strip B comprises two differently configurated closures or caps 4 (only one shown), and the length of the liner 2 is somewhat less than the length of the rail 1. Each cap 4 comprises a plate-like main body portion 4a, a larger projection 43 which corresponds to the projection 32 of the cap 3, and a smaller projection 41 which is integral with the head 4b. The corner portion of the head 4b is rounded. The projection 41 and head 4b have a common inner end face 42 which abuts against the corresponding end face 2d of the liner 2 and is welded or otherwise bonded thereto when the strip B is assembled in a manner as shown in FIG. 4. The projection 41 is then welded to the end faces of the lips 2a, 2b and the shock-absorbent front portions 2c is welded to the head 4b. The projection 41 extends into and fills the corresponding end portion of tthe groove 13 in the rail 1 of the strip B, i.e., the zone where the cap 4 is integrally connected with the liner 2 is located inwardly of the corresponding end of the groove 13.

FIG. 7 shows a portion of a third strip C which comprises a rail 101, a liner 102 and two closures or caps 104. These caps correspond substantially to the cap 4 with the exception that their plate-like main body portions 104a make with the longitudinal direction of the rail 101 an angle other than 90 degrees. In the illustrated embodiment, the angle is less than 90 degrees whereby the strip C resembles a streamlined body which enhances its appearance and enables it to offer less resistance to the flow of air along the frame of an automotive vehicle. The corner portions of the heads 104b are rounded.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. As a novel article of manufacture, a decorative strip for use on automobile frames and the like, comprising an elongated rail having a rear face and a front face provided with a longitudinally extending groove; a partition wall forming the bottom of said longitudinally extending groove and being spaced from said rear face so as to form together with the same a hollow space within said elongated rail rearwardly of said longitudinally extending groove, said elongated rail being open at both ends thereof so that said hollow space as well as said groove each have open ends; an elongated liner having a shock-absorbent portion extending forwardly beyond said front face and a retaining portion received and secured in said groove to anchor the liner therein, said liner having opposite ends respectively located at said open ends of said groove; and a pair of caps each having a head integrally bonded to an end of said liner at the respective open ends of said groove so as to firmly secure said caps to said decorative strip, and said caps each having a projection extending beyond the respective head into said open ends of said hollow space within said rail, so as to prevent turning of the respective caps relative to said rail about the respective heads which are each integrally connected to said opposite ends of said liner.

2. An article as defined in claim 1, wherein the cross sectional configuration of said heads is identical with the cross sectional configuration of said shock-absorbent portion of said liner.

3. An article as defined in claim 2, wherein the cross sectional contour of said rail with said liner therein is identical with the cross sectional contour of the respective cap and head, whereby the outer surfaces of said strip are flush with the corresponding outer surfaces of said caps.

4. An article as defined in claim 1, wherein each cap comprises a substantially plate-like main body portion adjacent to said one end of said rail, and wherein said head and said projection are provided on said main body portion.

5. A strip as set forth in claim 4, wherein the plane of said main body portion makes with the longitudinal direction of said rail an angle other than 90 degrees.

6. An article as defined in claim 1, wherein said liner consists at least in part of elastically deformable material.

7. An article as defined in claim 1, wherein said liner consists at least in part of elastically deformable material, said rail consists of rigid material, and said head of each of said caps also consists of elastically deformable material.

8. An article as defined in claim 1, wherein said groove is of dove-tail configuration, and wherein said retaining portion of said liner fills said groove at least partially; and wherein the respective heads of said caps are welded to the respective ends of said shock-absorbent portion of said liner to prevent shrinkage of the latter.

9. An article as defined in claim 1, wherein said liner consists of elastically deformable synthetic thermoplastic material, and wherein at least said projection of the respective cap consists of a material which is weldable to the material of said liner.

10. A strip as defined in claim 1, wherein said rail consists of rolled metallic material.

11. As a novel article of manufacture, a decorative strip for use on automobile frames and the like, comprising an elongated rail having a rear face and a front face provided with a longitudinally extending groove increasing in width in direction from said front face and towards said rear face; a partition wall forming the bottom of said longitudinally extending groove and being spaced from said rear face so as to form together with the same a hollow space within said elongated rail rearwardly of said longitudinally extending groove, said elongated rail being open at least at one end thereof so that said hollow space as well as said groove each have an open end; an elongated liner having a shock-absorbent portion extending forwardly beyond said front face and a retaining portion received and secured in said groove to anchor the liner therein, said retaining portion including two spaced-apart lips received in said groove and said lips defining with said partitions wall a first elongated channel and said hollow space constituting a second elongated channel, each being open at the respective longitudinally spaced ends thereof, said liner having an end located at the open end of said groove; and a cap having a head integrally connected to said end of said liner at one end of said strip so as to firmly secure said cap to said strip, said cap having a first projection and a second projection which respectively extend into said first and second channels; and an additional cap similar to the first-mentioned cap located at the other end of said rail spaced from said one end with one of the projections of said additional cap extending into the first channel and the other of the projections extending into the second channel, the head of said additional cap being integrally connected to an other end of said liner spaced from said one end thereof.

References Cited by the Examiner

UNITED STATES PATENTS

| | | | |
|---|---|---|---|
| 1,753,411 | 4/1930 | Gunn | 293—71 |
| 1,972,283 | 9/1934 | Zimmers | 280—163 |
| 2,182,085 | 12/1939 | Kellner et al. | 293—71 X |
| 2,531,967 | 11/1950 | Bishop | 293—71 |

FOREIGN PATENTS 1,039,729   5/1953   France.

ARTHUR L. LA POINT, *Primary Examiner.*

H. BELTRAN, *Assistant Examiner.*